United States Patent [19]

Kawamura et al.

[11] Patent Number: 4,563,715
[45] Date of Patent: Jan. 7, 1986

[54] HEAD POSITION CONTROL DEVICE

[75] Inventors: Noriyuki Kawamura; Nobuhiro Aizawa, both of Chichibu; Shigeki Koizumi, Yokoze; Masaru Koyahara; Tetsuo Tomita, both of Chichibu, all of Japan

[73] Assignee: Canon Denshi Kabushiki Kaisha, Tokyo, Japan

[21] Appl. No.: 457,487

[22] Filed: Jan. 12, 1983

[30] Foreign Application Priority Data

Jan. 22, 1982 [JP] Japan ................................. 57-8617

[51] Int. Cl.[4] ............................................. G11B 5/55
[52] U.S. Cl. ......................................................... 360/78
[58] Field of Search ........................................... 360/78

[56] References Cited

FOREIGN PATENT DOCUMENTS 52-2344  10/1977  Japan ..................................... 360/78
55-38621  3/1980  Japan ..................................... 360/78

Primary Examiner—George G. Stellar
Attorney, Agent, or Firm—Fitzpatrick, Cella, Harper & Scinto

[57] ABSTRACT

A head position control device capable of controlling the position of mutually cooperating plural heads with a circuit provided in a drive thereby reducing the burden of the attached system and enabling independent seeking operations of the heads on a magnetic disk. The head position control device of the present invention performs track seeking operation within a minimum time regardless of the access time of the attached system thereby reducing the head switching time, and also allows reduction in the dimension and weight of the entire system.

10 Claims, 6 Drawing Figures

HEAD POSITION CONTROL DEVICE

BACKGROUND OF THE INVENTION

1. Field of the Invention

The present invention relates to a head position control device capable of address control of mutually cooperating plural heads thereby enabling faster independent seeking operation of the heads.

2. Description of the Prior Art

FIGS. 1, 2A and 2B show a conventional disk drive mechanism in exploded perspective views.

In FIG. 1 a magnetic disk 1 is supported between a spindle 3 and a cone 2, and said spindle 3 is rotated with a pulley 6 by a drive mechanism consisting of a drive motor 4, a belt 5, a pulley 6 etc. to rotate said disk 1.

A magnetic head 7 for writing and reading information to and from the disk 1 is mounted on a head carriage 8. In response to the direction and amount of rotation of a stepping motor 9, a steel belt 10 moves the head carriage 8 in a direction A or in the opposite direction.

In this manner the head 7 can select an arbitrary track position on the disk 1. Also a shield plate 8a provided on the head carriage 8 and a detecting switch 11 composed of a photocoupler are provided to detect when the head 7 is at a track position "00".

The head 7 is connected to a reading circuit 12 for information reading and a writing circuit 13 for information writing, and the driving motor 4, stepping motor 9, detecting switch 11 etc. are connected to a control circuit 14. FIGS. 2A and 2B are schematic perspective views of the arrangement shown in FIG. 1, however with plural heads 7.

In FIG. 2A there are provided plural magnetic disks 1a, 1b. Mutually cooperating magnetic heads 7a, 7b, mounted on the head carriage 8, are moved by the stepping motor 9 and the reciprocating motion of the steel belt 10. The head 7a is maintained in sliding contact with the disk 1a, while the head 7b is maintained in sliding contact with the disk 1b for mutual information exchange.

In FIG. 2B the disk 1 is provided on both faces (on top and bottom faces) with magnetic layers, and mutually linked magnetic heads 7a, 7b are so positioned as to sandwich said disk 1.

The arrangement shown in FIG. 2B also allows mutual information exchange between plural magnetic heads 7a, 7b.

Since such conventional device is not provided with a function of memorizing the track address of the disk 1, it has been necessary, in shifting the control from one disk to the other in the arrangement shown in FIG. 2A, to store the address in the control system or to effect an additional operation, when shifting the control to the first disk, of returning the head to the track "00" and then making access to a desired track.

The first-mentioned method is shown in more detail in FIG. 3. In the flow chart shown in FIG. 3, steps S1–S4, S51–S53, S6, S7, S81–S83 and S9 are repeated according to the necessity for independent seeking operation of the drives "1" and "2", but the steps S51–S53 and S81–S83 are burdensome to the control system and give rise to a long processing time. On the other hand the second-mentioned method apparently requires a long processing time since the head has to be returned to the reference position or the track "00" before the seeking operation each time the head is switched. In this manner the conventional methods have been associated with drawbacks of requiring a complex and large control system, and of requiring a long processing time in switching the control from one head to the other.

SUMMARY OF THE INVENTION

A first object of the present invention is to provide a head position control device capable, in independent positioning of mutually cooperating plural heads, of simplifying the procedure at the control system thereby reducing the burden therein.

A second object of the present invention is to provide a head position control device capable of signal processing in the drive itself thereby reducing the time required for track seeking operation and for head switching operation.

A third object of the present invention is to provide a head position control device allowing reduction in the dimension and weight of the entire system.

DESCRIPTION OF THE PREFERRED EMBODIMENTS

Figure 3:
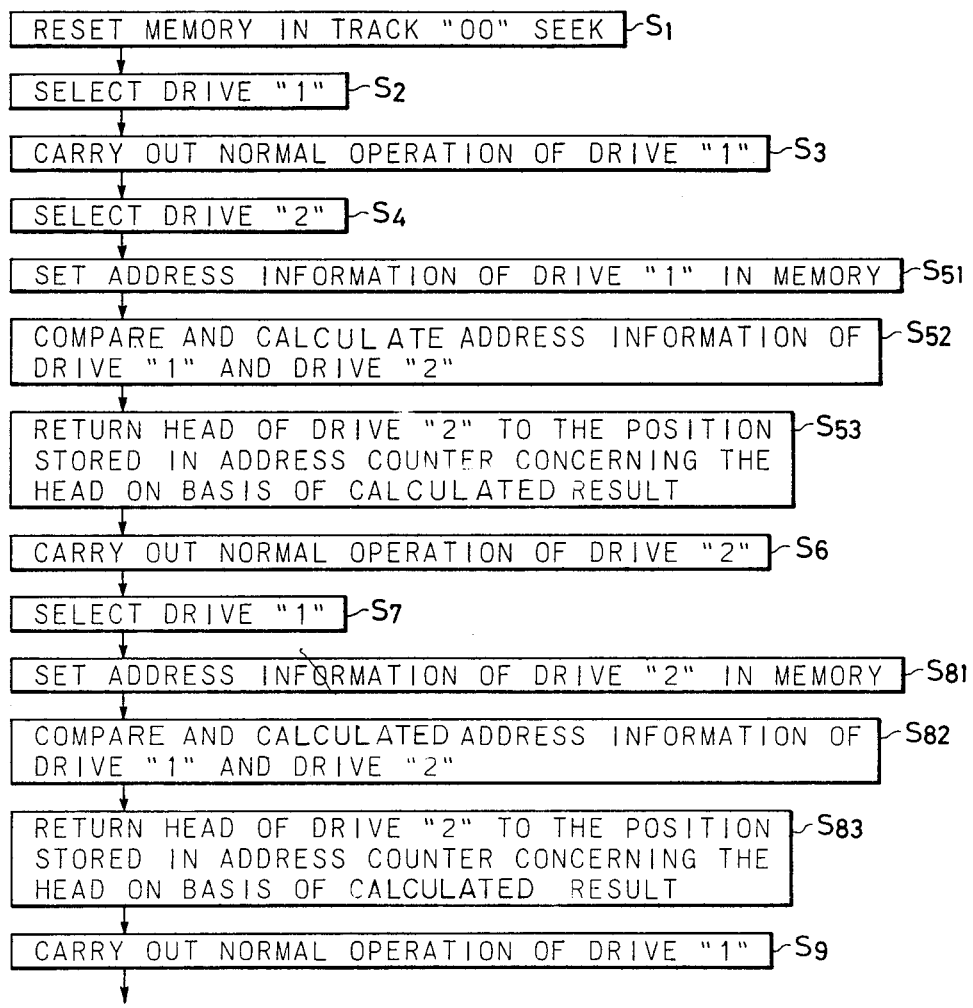
FIG. 3 is a flow chart showing a control sequence in a conventional device.
Figure 4:
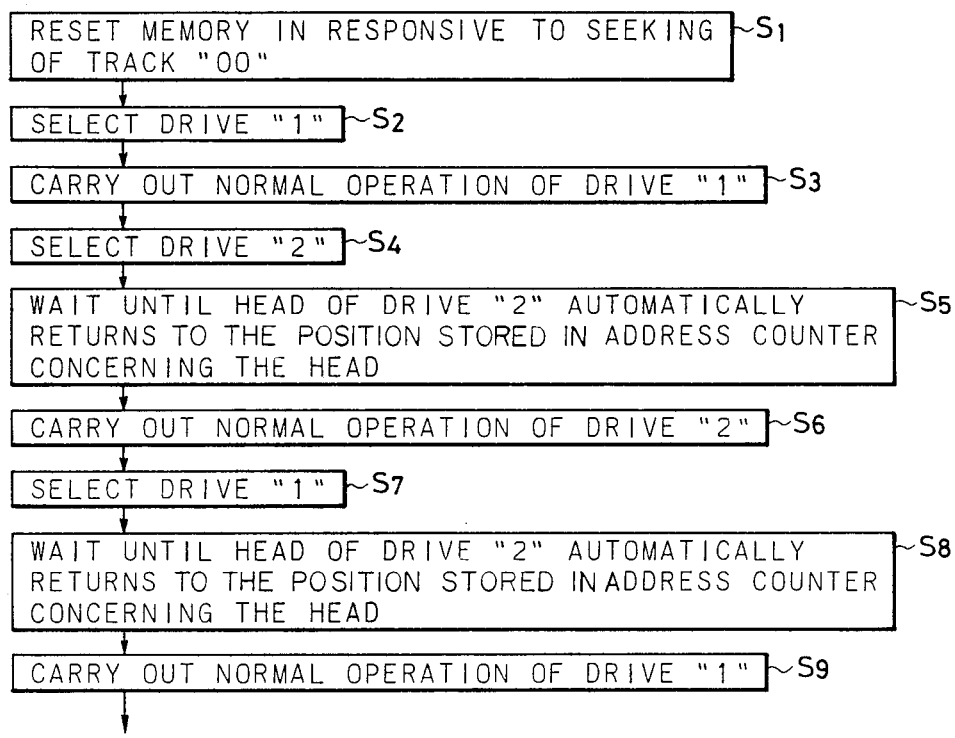
FIG. 4 is a flow chart showing a control sequence in a device of the present invention.

FIG. 4 shows a flow chart of the control sequence in the control system according to the present invention, in which steps S5 and S8 respectively replace the steps S51–S53 and S81–S83 shown in FIG. 3, thereby reducing the load in the control system and reducing the processing time.

Figure 1:
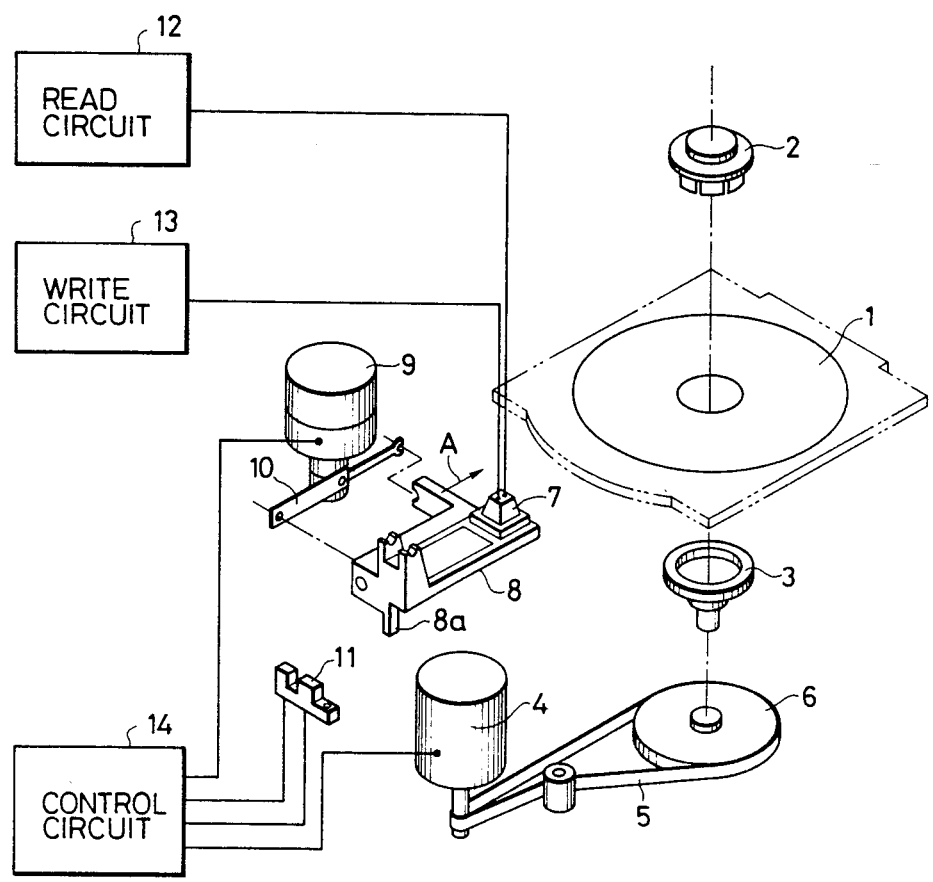
FIG. 1 is an exploded perspective view of a disk drive.
Figure 2A:
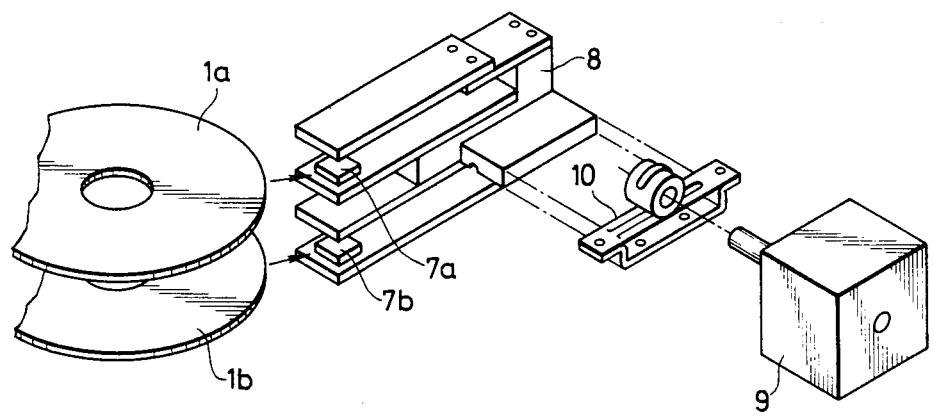
FIG. 2A is a schematic perspective view of a disk drive provided with plural disks.
Figure 2B:
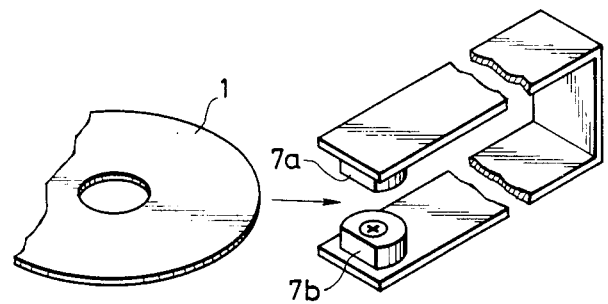
FIG. 2B is a schematic perspective view of a disk drive provided with plural disks.
Figure 5:
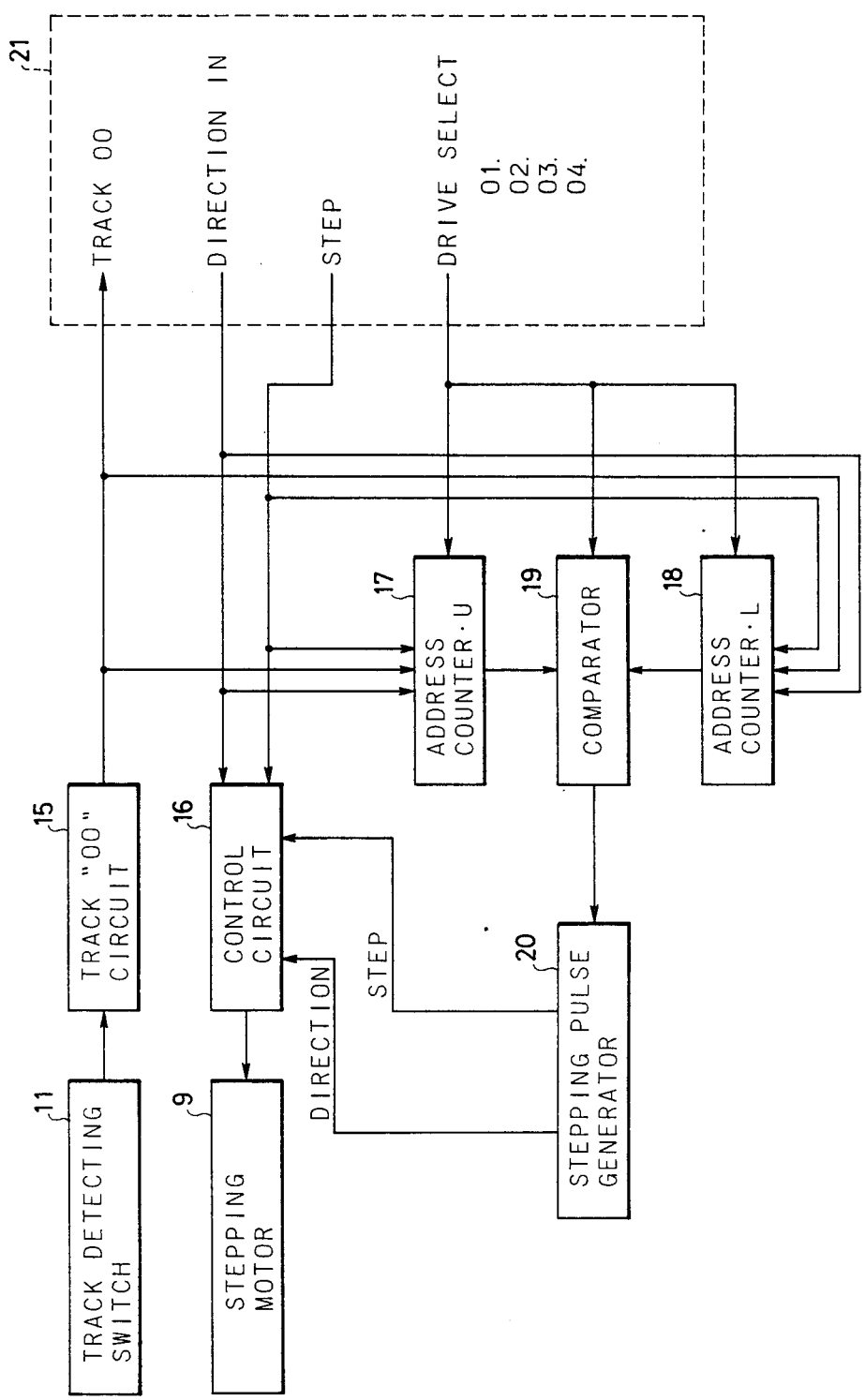
FIG. 5 is a block diagram of a control device in accordance with the present invention.

FIG. 5 shows an embodiment of the circuit in the drive according to the present invention, wherein a track detecting switch 11 is provided to detect the track "00" position, corresponding to the detecting switch shown in FIG. 1. There are also provided a track "00" circuit 15 for generating a track "00" signal in response to a signal from said track detecting switch 11; a stepping motor control circuit 16 for supplying drive signals to the stepping motor 9, same as that shown in FIG. 1 for moving the heads; an address counter 17 for storing the track address of a head corresponding to a disk; an address counter 18 for storing the track address of the other head corresponding to the other disk; a comparator 19 for comparing the output signals from said address counters; and a stepping pulse generator 20 for generating stepping pulse of a required number in response to a comparison signal from said comparator 19.

In the circuit shown in FIG. 5, a DIRECTION signal and a stepping signal are supplied as control signals from an external system to activate the stepping motor 9, whereby the heads are moved to track "00" position. Upon displacement of the heads to the track position, the track detecting switch 11 and the track "00" circuit 15 are activated to generate the track "00" signal, which are transmitted to the outside and are used for resetting the internal address counters 17, 18 to initial condition.

Thereafter said address counters memorize the track address states of the heads by performing counting up or down in response to the drive select signals 01–04, DIRECTION-IN signal and stepping signal.

When the head in use is switched over in response to a select signal, the comparator 19 reads the address signals from the address counters 17, 18 to calculate the direction and amount of the movement required for the newly selected head, and transmits a corresponding signal to the stepping pulse generator 20.

In response to said signal from the comparator 19, the stepping pulse generator 20 transmits a direction signal indicating the direction of head movement and stepping signals indicating the amount of said movement to the control circuit 16, whereby the stepping motor 9 is rotated by the desired number of steps in a desired direction to automatically move the newly selected head to the original head position.

In contrast to the conventional control achieved in the external system, the head position control device of the present invention is provided with head positioning function inside the drive itself, thereby reducing the load of the external system and enabling independent track seeking operations in mutually linked plural heads.

Also the present invention reduces the time required for switching the head positions for plural disks, and allows incorporation of the head position control device in the disk drive thereby reducing the dimension and weight of the entire system.

What we claim is:

1. A head position control device operative in cooperation with a magnetic disc, said device comprising:
   mutually linked plural magnetic heads for information write-in and read-out to and from tracks on a magnetic disk;
   memory means for memorizing track addresses of said plural heads;
   a means for generating a select signal for switching over information write-in or read-out from one of said heads to another thereof;
   comparator means for comparing the track address of one of said heads with that of another of said heads when the information write-in and read-out are switched over from said one of said heads to said other of said heads in response to a select signal and for producing a comparison signal representing said comparison; and
   means, in response to a comparison signal from said comparator means, for moving said other of said heads to the track address of said another head memorized in said memory means.

2. A head position control device according to claim 1, wherein said memory means comprises plural address counters for respectively storing the track addresses of said plural heads.

3. A head position control device according to claim 1, wherein said plural magnetic heads are maintained in sliding contact with a magnetic disk or respectively with plural magnetic disks.

4. A head position control device according to claim 2, wherein said plural magnetic heads are maintained in sliding contact with a magnetic disk.

5. A head position control device operative in cooperation with a magnetic disc, said device comprising:
   plural magnetic heads for information write-in and read-out to and from a magnetic disk;
   a head carriage for supporting said plural heads in a mutually cooperative manner;
   first memory means for storing the position of one of said plural head and producing an output signal representative thereof;
   second memory means for storing the position of another of said plural heads and producing an output signal representative thereof;
   comparator means for comparing the output signals from said first and second memory means and producing a comparison signal representative thereof; and
   means for generating a select signal for switch operation from said one of said heads to said other of said heads;
   movement control means for moving said head carriage in response to a comparison signal from said comparator means when operation of said one of said heads is switched over to said other of said heads in response to a select signal, thereby moving said plural heads from the position stored in said first memory means to the position stored in said second memory means.

6. A head position control device according to claim 5, wherein said movement control means comprises pulse generating means for transmitting a signal indicating the direction and amount of movement of said head carriage in response to the comparison signal from said comparator means, a motor for moving and positioning said plural heads, and a motor control circuit for controlling the rotation of said motor at least in response to the signal from said pulse generating means.

7. A head position control device according to claim 5, wherein said first and second memory means comprise address counters for storing the track addresses of the heads.

8. A head position control device according to claim 5, wherein said plural magnetic heads are maintained in sliding contact with a magnetic disk or respectively with plural magnetic disks.

9. A head position control device according to claim 6, wherein said first and second memory means comprise address counters for storing the track addresses of the heads.

10. A head position control device according to claim 6, wherein said plural magnetic heads are maintained in sliding contact with a magnetic disk or respectively with plural magnetic disks.

* * * * *

UNITED STATES PATENT AND TRADEMARK OFFICE
CERTIFICATE OF CORRECTION

PATENT NO. : 4,563,715

DATED : January 7, 1986

INVENTOR(S) : NORIYUKI KAWAMURA, ET AL.

It is certified that error appears in the above-identified patent and that said Letters Patent is hereby corrected as shown below:

Column 3, line 47, change "write-in and read-out" to --write-in or read-out--; and
line 55, change "said another head" to --said other of said heads--.

Column 4, line 15, change "plural head" to --plural heads--.

Signed and Sealed this

Sixteenth Day of September 1986

[SEAL]

Attest:

DONALD J. QUIGG

Attesting Officer

Commissioner of Patents and Trademarks